Feb. 21, 1967 R. SCHUTTE ETAL 3,305,640

ARRANGEMENT FOR THE STEREOPHONIC REPRODUCTION OF SIGNALS

Filed April 8, 1963

INVENTORS
RUDOLF SCHUTTE
NICOLAAS VAN HURCK
BY
Frank R. Trifari
AGENT

United States Patent Office 3,305,640

Patented Feb. 21, 1967

3,305,640

ARRANGEMENT FOR THE STEREOPHONIC REPRODUCTION OF SIGNALS

Rudolf Schutte and Nicolaas Van Hurck, Emmasingel, Eindhoven, Netherlands, assignors to North American Philips Company, Inc., New York, N.Y., a corporation of Delaware Filed Apr. 8, 1963, Ser. No. 271,292
Claims priority, application Netherlands, Apr. 19, 1962, 277,477/62
6 Claims. (Cl. 179—15)

The invention relates to an arrangement for the stereophonic reproduction of signals which are supplied to the arrangement in the form of the sum signal A+B of the coherent stereophonic signals A and B, the difference signal A—B of these coherent stereophonic signals amplitude modulated on a subcarrier with carrier suppression, and a pilot signal at half the subcarrier frequency. This arrangement comprises at its input end the parallel combination of an information channel which passes the stereophonic signals and of a pilot channel which exclusively passes the pilot signal and includes a frequency-doubler for locally producing the subcarrier oscillation to recover the stereophonic signals A and B. The output end of the arrangement includes two separate reproduction channels including reproducing devices.

The invention has for its object to provide an arrangement of the kind mentioned in the preamble of surprisingly simple structure, which is adjusted automatically and without a mechanical change-over either to stereophonic or to monaural reproduction, depending upon whether a stereophonic or a monaural input signal is received. Optimum reproduction qualities are obtained both in the case of stereophonic and in the case of monaural reproduction.

The arrangement in accordance with the invention is characterized in that each of the reproduction channels is connected, through an electronic switch which demodulates the information signals and is balanced for the switching signal, to the information channel. The two electronic switches are controlled by the output voltage of a pilot channel comprising a threshold device. The pilot channel is blocked at an input level below its threshold value, while the information signal from the information channel is simultaneously fed through the conductive electronic switches to both reproduction channels. At an input level of the pilot channel above its threshold value the pilot channel supplies a switching signal for the two electronic switches. The switching signal releases and blocks the two electronic switches in succession, a sample of the information signal being alternately supplied to one reproduction channel and to the other.

When the threshold device in the pilot channel is a gas-filled tube which in the case of stereophonic transmission is ignited by the pilot signal and in the case of monaural transmission is extinguished by the absence of a pilot signal, a visible indication is simultaneously automatically provided which denotes whether a stereophonic or a monaural reproduction is concerned.

Figure 1:
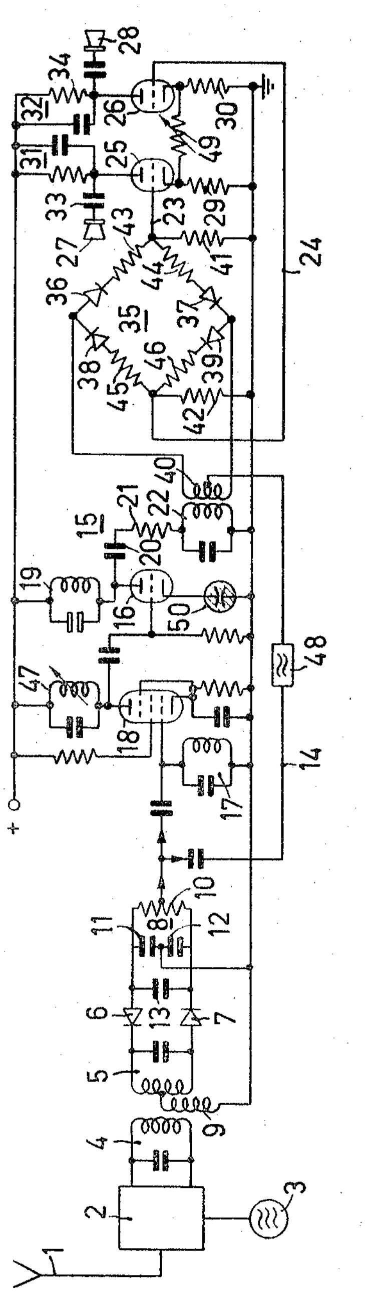
Figure 3:
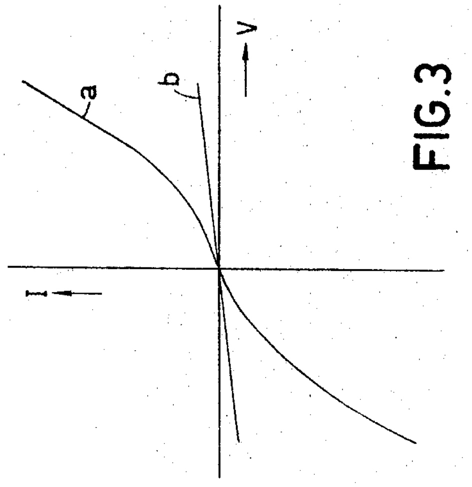
Figure 2:
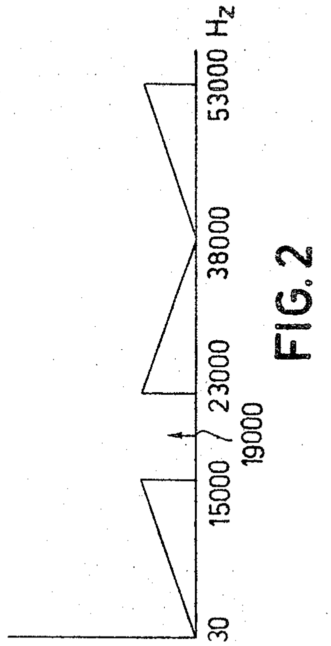

In order that the invention may be readily carried into effect, it will now be described more fully with reference to the accompanying drawing, in which:

FIG. 1 shows a stereophonic wireless receiver including an arrangement in accordance with the invention, and FIGS. 2 and 3 represent a frequency diagram and a current-voltage diagram, respectively, illustrating the operation of the stereophonic wireless receiver shown in FIG. 1.

The stereophonic receiver shown in FIG. 1 is designed for the reception of frequency-modulated signals transmitted on the same carrier frequency, which consist of the sum signal A+B of the coherent stereophonic signals A and B, for example, in the frequency band of from 30 to 15,000 c./s. and of the difference signal A—B amplitude-modulating a subcarrier frequency of 38 kc./s. with suppressed carrier wave, and of a pilot signal of 19 kc./s., the modulation signal thus formed in the frequency band of from 30 to 53,000 c./s. frequency-modulating the carrier wave frequency with a sweep of 75 kc./s.

The stereophonic receiver is provided with a receiving aerial 1 and an intermediate-frequency stage 2 comprising a mixer stage and an oscillator 3 connected thereto. The resulting intermediate-frequency oscillations in the band of 10,700 kc./s. are supplied, after amplification and, if desired, after limitation in the intermediate-frequency stage 2, to an output bandpass filter constituted by two coupled circuits 4 and 5.

The bandpass filter 4, 5 forms part of a kind of frequency detector known per se for the detection of normal FM transmissions. It comprises two rectifiers 6, 7 which are connected with opposite conductivities to the ends of the circuit 5 and to an output impedance 8. A center tapping on the circuit 5 is connected to the end of a coupling coil 9 coupled to the circuit coil 4. The output impedance 8 of the frequency detector includes a resistor 10 shunted by the series combination of two capacitors 11, 12 having a ground-connected junction point and by a smoothing capacitor 13. The output voltage of the frequency detector is derived from a centre tapping on the output resistor 10.

An output voltage of the form illustrated in the frequency diagram of FIG. 2 then appears across the output impedance of the frequency detector. This voltage as will appear from the figure, is composed of the sum signal A+B in the frequency band of from 30 to 15,000 c./s., of the difference signal A—B modulating the subcarrier frequency of 38 kc./s. with suppressed carrier in the frequency band of from 23,000 to 53,000 c./s., and of the pilot signal of 19,000 c./s.

In order to recover the coherent stereophonic signals A and B from the output voltage of the frequency detector illustrated in FIG. 2 these signals are supplied to an arrangement comprising at its input end the parallel combination of an information channel 14 passing the output voltage of the frequency detector and of a pilot channel 15 exclusively passing the pilot signal and including a frequency-doubler 16 for locally producing the subcarrier frequency of 38 kc./s. The pilot signal of 19 kc./s. in the pilot channel is supplied to a triode 16 arranged as a frequency-doubler after frequency selection in a pilot filter 17 and after amplification in a pilot amplifier 18. The local carrier oscillation of 38 kc./s. is derived from a circuit 19 in the anode circuit of the triode 16 tuned to the local subcarrier frequency. Circuit 19 is connected through a blocking capacitor 20 and a series resistor 21 to a circuit 22 tuned to the subcarrier frequency for further manipulation of the local subcarrier oscillation.

The coherent stereophonic signals A and B are derived from the output ends and supplied to reproduction devices 27, 28 through low-frequency amplifiers 25, 26 connected in separate reproduction channels 23, 24. The low-frequency amplifiers are of identical design and are provided with triodes having unbypassed cathode resistors 29, 30 connected in the cathode circuits. The amplified coherent signals A and B are derived from output impedances 31, 32 connected in the anode circuits of the triodes 25, 26 which, as is shown diagrammatically in the figure, are connected through blocking capacitors 33, 34 to the reproduction devices 27, 28.

In order to achieve in the shown arrangement for stereophonic reproduction an automatic change-over to monaural reproduction in the case of a monaural input signal and to stereophonic reproduction in the case of a stereophonic input signal, each of the reproduction channels 23, 24 is connected to the information channel 14 through an electronic switch 35 passing the information signals and balanced for the switching signal. The switch is constituted in the embodiment shown by rectifiers 36, 37 for the reproduction channel 23 and by rectifiers 38, 39 for the reproduction channel 24. The electronic switches 36, 37; 38, 39 thus formed are connected to each other and together constitute a closed ring, around which rectifiers 36, 37; 38, 39 have the same pass directions. The two electronics switches 36, 37; 38, 39 are connected through a coupling winding 40 to the output circuit of the pilot channel 15 and the information channel 14 is connected to a center tap on the coupling winding 40. The output voltages of the two electronic switches 36, 37; 38, 39 are derived, for further manipulation in the separate reproduction channels 23, 24, from output resistors 41, 42 of very high value, for example, of 1 MΩ.

If the stereophonic signal represented in FIG. 2 occurs at the input terminals of the arrangement described above, it is applied through the information channel 14 to the center tap on the coupling winding 40, while in the pilot channel 15 the pilot signal selected in the circuit 17 and amplified in the pilot amplifier 18, after frequency-doubling in the triode 16, is supplied as a switching signal at subcarrier frequency through the coupling winding 40 to the electronic switches 36, 37; 38, 39 connected to the reproduction channels 23, 24. The switches are consequently rendered conductive in succession in consecutive half-periods of the subcarrier frequency. In order to prevent the winding 40 from being short-circuited through the conducting rectifiers 36, 37; 38, 39 of the electronic switches, resistors 43, 44, 45, 46, respectively, of equal values are connected in series with each of the amplifiers 36, 37; 38, 39.

The phase of the local subcarrier frequency at the winding 40 is caused to correspond accurately to the phase of the subcarrier frequency associated with the incoming difference signal. For example, this phase adjustment may be effected in a simple manner by detuning the output circuit in the pilot amplifier 18 by means of the variable circuit coil 47. Consequently, in consecutive half-periods of the local subcarrier frequency which acts as switching signal, samples of the incoming information signal occur at the output resistors 41, 42 of the two electronic switches 36, 37; 38, 39. The information signal for one reproduction channel is constituted by the sum of the sample of the A+B signal and of the value of the A−B signal in the positive half-perior of the subcarrier frequency and for the other reproduction channel by the sum of the sample of the sum signal A+B and of the value of the A−B signal in the negative half-period of the subcarrier frequency, which samples, after being smoothed by output impedances 31, 32 designed as smoothing filters in the output circuits of the low-frequency amplifiers 25, 26, yield the coherent stereophonic signals A and B. Simultaneously with the smoothing of the samples, the pilot signal coming in through the information channel is suppressed in the smoothing filters 31, 32 which may act as de-emphasis networks.

Besides the very simple structure described, the stereophonic receiver has the advantage that an excellent reproduction quality is obtained. In particular, switching signals may be used of an amplitude sufficiently large to ensure a considerable independence of the characteristic curves of the rectifier cells without the risk of overdriving the low-frequency amplifiers 25, 26, since as a result of the balanced construction of the electronic switches 36, 37; 38, 39 the test values of the information signals derived from the output resistors 41, 42 are independent of the amplitude of the switching signal. To obtain optimum reproduction quality it is of importance not to load the output resistors 41, 42 of the electronic switches 36, 37; 38, 39 directly by the smoothing filters 31, 32, for example, by interposing the triodes 25, 26, while for the reproduction of the interference level it is of advantage to include in the information channel 14 a low pass filter 48 which passes only the signals represented in FIG. 2. In this manner, the distortion level could be reduced to less than 1%.

In addition to optimum reproduction quality, the arrangement also has the advantage of particularly favourable crosstalk-preventing properties, since as a result of the absence of separating filters, in the reproducing device a frequency-independent cross-talk occurs in both reproduction channels 23, 24, with respect to which it has been found that the voltages in the two reproduction channels 23, 24 can be represented by:

$$A+\alpha B, \text{ and}$$
$$B+\alpha A,$$

respectively. In these expressions $\alpha B$ and $\alpha A$ represent the crosstalk voltages and $\alpha$ the crosstalk factors which are of the same value and frequency-independent; this kind of crosstalk can be compensated for in a simple manner by means of a parallel resistor 49 which is connected between the cathode circuits 29, 30 of the triodes 25, 26 and is adjustable for cross talk compensation. The crosstalk level was reduced, for example, to less than −40 db, which is an excellent result for stereophonic reproduction.

Hereinbefore the operation and the advantages of the concerned arrangement have been described for the case where a stereophonic signal of the kind represented in FIG. 2 is supplied to the input terminals of the stereophonic reproduction arrangement; however, this arrangement also affords the advantage that when a monaural input signal is supplied, for example, in the frequency band of from 30 to 15,000 c./s., a monaural reproduction of excellent quality is obtained without a mechanical changeover. In this case, the monaural signal is supplied through the information channel 14 to the center tap on the winding 40 and the pilot channel 15 is blocked by means of a threshold device in the form of a gas-filled tube 50 connected in the cathode circuit of triode 16, the threshold value of which, which is constituted by the ignition voltage, being only exceeded by the pilot signal in case of a stereophonic input signal, whereas this threshold device otherwise rejects the signals entering the pilot channel 15 which in this case are to be considered as interference signals. The gas-filled tube 50 is ignited in the case of a stereophonic input signal and is extinguished in the case of a monaural input signal, so that the said threshold device in the form of a gas-filled tube 50 has the advantage that it not only serves as threshold device, but also provides a visible indication of whether a stereophonic or a monaural reproduction is concerned.

In the case of a monaural input signal the pilot channel 15 is blocked and a direct transmission of the monaural input signal takes place through the electronic switches 36, 37; 38, 39 to the reproduction channels 23, 24; in accordance with the polarity of the input signal of each of the two electronic switches 36, 37; 38, 39 each time one of the rectifiers is conducting. For example, with an input signal of positive polarity the rectifiers 36, 39 of the electronic switches are conducting and the rectifiers 37, 38 are cut off, whereas with an input signal of negative polarity the rectifiers 36, 39 are cut off and the rectifiers 37, 48 are conducting. Through the alternately conducting rectifiers 36, 39; 37, 38 there is a substantially distortion-free transmission of the monaural input signal to the output impedance of the electronic switches 36, 37; 38, 39 constituted by the resistors 41, 42, as will now be described with reference to the voltage-current characteristic curves shown in FIG. 3.

If in this figure curve *a* represents the current voltage characteristic curve of the two electronic switches constituted by the rectifiers 36, 37; 38, 39 for an input signal supplied thereto. By using high resistance output resistors 41, 42 the voltage-current characteristic curve *b* is obtained for the electronic switches 36, 37; 38, 39. This curve ensures distortion-free transmission of the monaural signal through the electronic switches 36, 37; 38, 39 due to its linearity. Since the condition of resistance loading of the electronic switches 36, 37; 38, 39 for optimum reproduction quality is the same with stereophonic and with monaural transmission, optimum reproduction qualities can be obtained without difficulty with these two manners of transmission, for example, with monaural and with stereophonic transmission, the distortion level is below 1%.

The use of the measures in accordance with the invention provides, in addition to a surprisingly simple design, an arrangement for the stereophonic reproduction of signals which changes over automatically to a stereophonic reproduction in the case of a stereophonic input signal and to a monaural reproduction in the case of a monaural input signal. Optimum reproduction qualities are obtained both with stereophonic and with monaural transmission. Moreover, the use of a gas-filled tube as threshold device in the pilot channel 15 provides automatically a visible indication of whether a stereophonic or a monaural reproduction is received.

In one embodiment of the invention the following components were employed:

Tubes 16, 18: double tube ECF80
Tubes 25, 26: double triode ECC83
Gas-filled tube 50: Z10
Rectifier cells 36, 37, 38, 39: OA73
Resistors 41, 42: 1MΩ
Resistors 43, 44, 45, 46: 4,700Ω

Besides the arrangement described hereinbefore, other embodiments are possible within the scope of the invention. For example, the information channel may be connected through series resistors to electronic switches arranged as parallel impedances in the form of transistors in the reproduction channels, while for optimum reproduction qualities the electronic switches constituted by transistors must also be loaded by a resistor. It is also possible to use transistors instead of tubes in the stereophonic wireless receiver; in this case, the low-frequency amplifiers in the form of transistor amplifiers in the reproduction channels are provided, for example, with non-shunted emitter resistors, while for cross-talk compensation a variable resistor is interposed between the emitter circuits of the two transistors.

What is claimed is:

1. A circuit for the reproduction of monaural and stereophonic input signals, said stereophonic signals being in the form of a sum signal of first and second coherent signals, a difference signal of said first and second signals modulated on a subcarrier wave with suppressed carrier, and a pilot signal at half the frequency of said subcarrier wave, said circuit comprising a source of said input signals, first and second demodulator circuits, first and second output circuits connected to said first and second demodulator circuit respectively, a first channel for applying said input signals at least in the frequency bands of said sum signal and said modulated subcarrier wave to said first and second demodulator circuits, and a second channel connected to said source comprising means responsive to application thereto of said pilot signal for applying oscillations of the frequency of said subcarrier wave to said first and second demodulator circuits, said second channel comprising an amplifier device having input, common and output electrodes, a two terminal indicating device having a threshold voltage, means applying said pilot signal between said input and common electrodes by way of said indicating device, whereby said amplifier device is cut off in the absence of said pilot signal, and output circuit means connected to said output electrode, for applying said oscillations to said demodulator circuits whereby said second channel is blocked when said amplifier device is cut off.

2. The circuit of claim 1 in which said first and second demodulator circuits are interconnected to form a balanced electronic switch.

3. A circuit for the reproduction of monaural and stereophonic input signals, said stereophonic signals being in the form of a sum signal of first and second coherent signals, a difference signal of said first and second signals modulated on a subcarrier wave with suppressed carrier, and a pilot signal at half the frequency of said subcarrier wave, said circuit comprising a source of said input signals, first and second demodulator circuits, first and second output circuits connected to said first and second demodulator circuit respectively, a first channel for applying said input signals at least in the frequency bands of said sum signal and said modulated subcarrier wave to said first and second demodulator circuits, and a second channel connected to said source comprising means responsive to application thereto of said pilot signal for applying oscillations of the frequency of said subcarrier wave to said first and second demodulator circuits, said second channel comprising a frequency doubling stage including an amplifier device having input common and output electrodes, filter means for applying said pilot signal to said input electrode, a two terminal indicating device having a threshold voltage connected between said common electrode and a point of reference potential, whereby said device is cut off in the absence of said pilot signal, and a resonant output circuit tuned to the frequency of said subcarrier wave coupled to said output electrode for deriving said oscillations when said amplifier device is conductive.

4. The circuit of claim 3 in which said indicating device is a gas filled tube.

5. The circuit of claim 3 in which said amplifier device is an electron discharge device, wherein said input, common and output electrodes are the control grid, cathode and anode respectively of said discharge device.

6. A circuit for the reproduction of input signals which may be monaural audio frequency signals or stereophonic signals, said stereophonic signals including audio frequency signals, subcarrier said band signals, and pilot signals, said circuit comprising a source of said input signals, electronic switch means having two output circuits, means connected to said source for applying said input signals in the frequency ranges of said audio frefrequency signals and sideband signals to said switch means, and a channel connected to said source for applying oscillations of the frequency of said subcarrier to to said switch means when said pilot signals are present, said channel comprising an input circuit tuned to the frequency of said pilot signals, an amplifying device having input, common and output electrodes, a two terminal indicating device having a threshold voltage, means connecting said input circuit to said input electrode, means connecting said two terminal device between said common electrode and a point of constant potential, whereby said amplifier device is conductive only when said pilot signal is present, and output circuit means connected to said output electrode for applying said oscillations to said switch means only when said amplifier device is conductive.

References Cited by the Examiner

UNITED STATES PATENTS

| | | | |
|---|---|---|---|
| 3,070,662 | 12/1962 | Eilers | 179—15 |
| 3,146,311 | 8/1964 | Wolff | 179—15 |
| 3,167,615 | 1/1965 | Wilhelm et al. | 179—15 |
| 3,175,040 | 3/1965 | Recklinghausen | 179—15 |
| 3,187,103 | 6/1965 | Loughlin et al. | 179—15 |
| 3,225,143 | 12/1965 | Parker | 179—15 |

DAVID G. REDINBAUGH, *Primary Examiner.*

ROBERT L. GRIFFIN *Examiner.*